United States Patent
Li et al.

(10) Patent No.: US 9,507,848 B1
(45) Date of Patent: Nov. 29, 2016

(54) INDEXING AND QUERYING SEMI-STRUCTURED DATA

(75) Inventors: Zhenmin Li, Mountain View, CA (US); Chengdu Huang, Sunnyvale (CA); Spiros Xanthos, Mountain View, CA (US); Qingbo Zhu, Sunnyvale, CA (US); Yuanyuan Zhou, San Diego, CA (US)

(73) Assignee: VMware, Inc., Palo Alto, CA (US)

( * ) Notice: Subject to any disclaimer, the term of this patent is extended or adjusted under 35 U.S.C. 154(b) by 467 days.

(21) Appl. No.: 12/888,749

(22) Filed: Sep. 23, 2010

Related U.S. Application Data

(60) Provisional application No. 61/277,571, filed on Sep. 25, 2009.

(51) Int. Cl.
*G06F 17/30* (2006.01)

(52) U.S. Cl.
CPC .............................. *G06F 17/30613* (2013.01)

(58) Field of Classification Search
CPC ............. G06F 17/30; G06F 17/30864; G06F 17/30613
USPC ................. 707/711, 742, E17.002, E17.057, 707/E17.083, E17.123, 999, 999.001, 707/999.003, 755
See application file for complete search history.

(56) References Cited

U.S. PATENT DOCUMENTS

| | | | |
|---|---|---|---|
| 6,718,336 B1* | 4/2004 | Saffer | G06F 17/30557 |
| 7,844,999 B1* | 11/2010 | Aguilar-Macias et al. | 726/3 |
| 8,024,329 B1* | 9/2011 | Rennison | 707/723 |
| 2004/0117427 A1* | 6/2004 | Allen et al. | 709/200 |
| 2004/0260866 A1* | 12/2004 | Davis | 711/108 |
| 2006/0248037 A1* | 11/2006 | Meyer et al. | 707/1 |
| 2007/0078872 A1* | 4/2007 | Cohen | 707/101 |
| 2007/0255698 A1* | 11/2007 | Kaminaga et al. | 707/3 |
| 2008/0059420 A1* | 3/2008 | Hsu et al. | 707/3 |
| 2009/0228507 A1* | 9/2009 | Jain et al. | 707/102 |
| 2010/0205172 A1* | 8/2010 | Luk | 707/715 |
| 2010/0318532 A1* | 12/2010 | Sznajder et al. | 707/759 |

OTHER PUBLICATIONS

"Inverted Index", Wikipedia, pp. 1-4.*
Zobel et al., "Inverted Files for Text Search Engines", Jul. 2006, ACM Computing Surveys, pp. 1-56.*

\* cited by examiner

*Primary Examiner* — Alexey Shmatov

(57) ABSTRACT

Generating an inverted index is disclosed. Semi-structured data from a plurality of sources is parsed to extract structure from at least a portion of the semi-structured data. The inverted index is generated using the extracted structure. The inverted index includes a location identifier and a data type identifier for one or more entries of the inverted index.

20 Claims, 10 Drawing Sheets

INDEXING AND QUERYING SEMI-STRUCTURED DATA

CROSS REFERENCE TO OTHER APPLICATIONS

This application claims priority to U.S. Provisional Patent Application No. 61/277,571 entitled INDEXING AND QUERYING SEMI-STRUCTURED DATA filed Sep. 25, 2009 which is incorporated herein by reference for all purposes.

BACKGROUND OF THE INVENTION

Traditionally organizations have invested in systems that enable rapid access to structured data stored in database systems. However, structured data only represents a fraction of all information stored by an organization. It is often difficult to search, find, and analyze patterns in unstructured and semi-structured data using traditional tools. These types of data often cannot be managed efficiently and cost-effectively in traditional databases or in data warehouses that try to force a structure on to the unstructured and semi-structured data. When the unstructured or semi-structured data changes or becomes larger in size, it becomes difficult to maintain and scale traditional solutions. Organizations have also tried to utilize keyword search solutions, but its success has been limited by its inability to handle sophisticated pattern search analysis. Therefore, there exists a need for an efficient and scalable pattern search handling of unstructured or semi-structured data.

BRIEF DESCRIPTION OF THE DRAWINGS

Various embodiments of the invention are disclosed in the following detailed description and the accompanying drawings.

DETAILED DESCRIPTION

Figure 1:
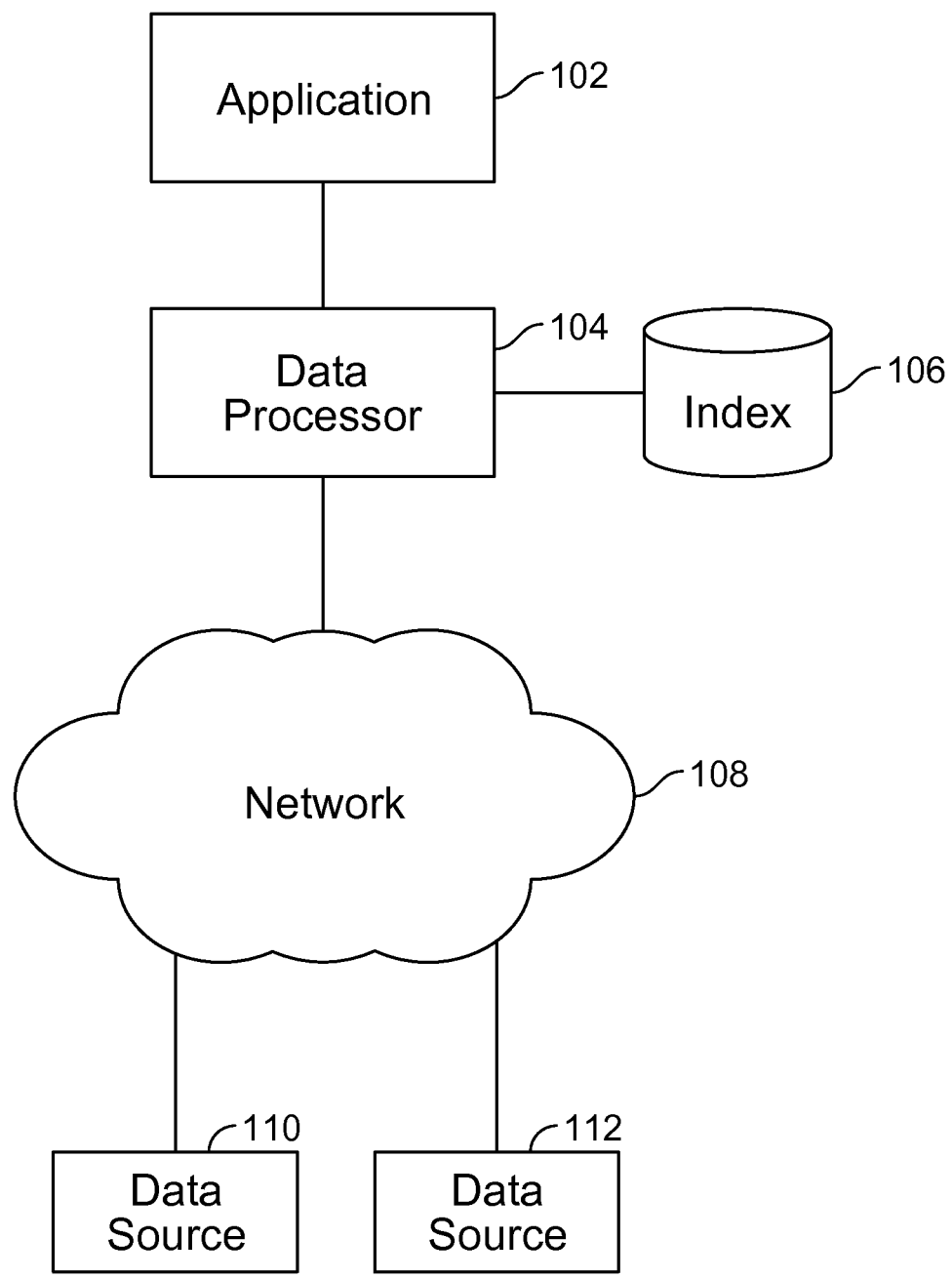
FIG. 1 is a block diagram illustrating an embodiment of a system for indexing and analyzing data.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Enabling pattern search of unstructured and semi-structured data is disclosed. An example of semi-structured data includes data that may not conform to the formal structure of tables and data models of databases but is associated with tags, data types, metadata or other markers to identify semantic elements, information, and/or hierarchies of records and/or fields of the data. A semi-structured data from a plurality of sources are parsed to extract structure data, semantic elements, information, and/or hierarchies from the semi-structured sources of data. An inverted index is generated using the extracted information. The inverted index includes a location and a data type for one or more entries of the inverted index and/or one or more fields from the extracted information. A user may query the inverted index to analyze patterns associated with the unstructured and semi-structured data.

For example, in the context of technical support, support engineers may utilize the inverted index to improve support provided to customers. Typically when customers encounter problems, they send semi-structured support artifacts such as logs, configurations, scripts, code, system status, or performance statistics to the product vendor for diagnosis. These semi-structured data can be efficiently indexed in an inverted index, and the inverted index can be easily searched to analyze patterns associated with the support artifacts to provide efficient support. For example, an inverted index that includes data associated with new data can be queried using a signature query of a known problem to determine whether the new data is also associated with the know problem.

FIG. 1 is a block diagram illustrating an embodiment of a system for indexing and analyzing data. Data processor 104, data source 110, and data source 112 are connected to network 108. Any number of data sources or data processors may exist. The elements of FIG. 1 are merely illustrative. Network 108 may include one or more of the following: a direct or indirect physical communication connection, mobile communication network, Internet, intranet, Local Area Network, Wide Area Network, Storage Area Network, and any other forms of connecting two or more systems or storage devices together. In some embodiments, data processor 104 obtains unstructured and semi-structured data from data source 110 and data source 112 via network 108. The obtained semi-structured data is processed by data processor 104 to create index 106. An example of index 106 includes an inverted index. In some embodiments, the data obtained from data source 110 and data source 112 are aggregated and/or stored in a storage associated with data processor 104. For example, data processor 104 saves a copy of the obtained data and the copy of the data is associated with corresponding elements of index 106 such that data references by entries of index 106 can be obtained from the stored copy. In some embodiments, data processor 104 indexes unstructured and semi-structured data by directly accessing data source 110 and data source 112. For example, data processor 104 does not store the data to be indexed in a local storage associated with data processor 104.

Application 102 utilizes index 106 to provide user desired functionality associated with index 106. For example, application 102 facilitates a user interface that can be used to query and view query results of index 106. In another example, application 102 facilitates data pattern search and/or analysis using index 106. Application 102 accesses index 106 via data processor 104. For example, application 102 facilitates pattern searches and/or analysis associated with unstructured and semi-structured data indexed by index 106 by querying index 106 via data processor 104. In some embodiments, application 102 directly queries index 106. In some embodiments, index 106 can be access by application 102 via an Application Programming Interface (API). For example, web services APIs allow users to build custom applications that use index 106.

Figure 2:
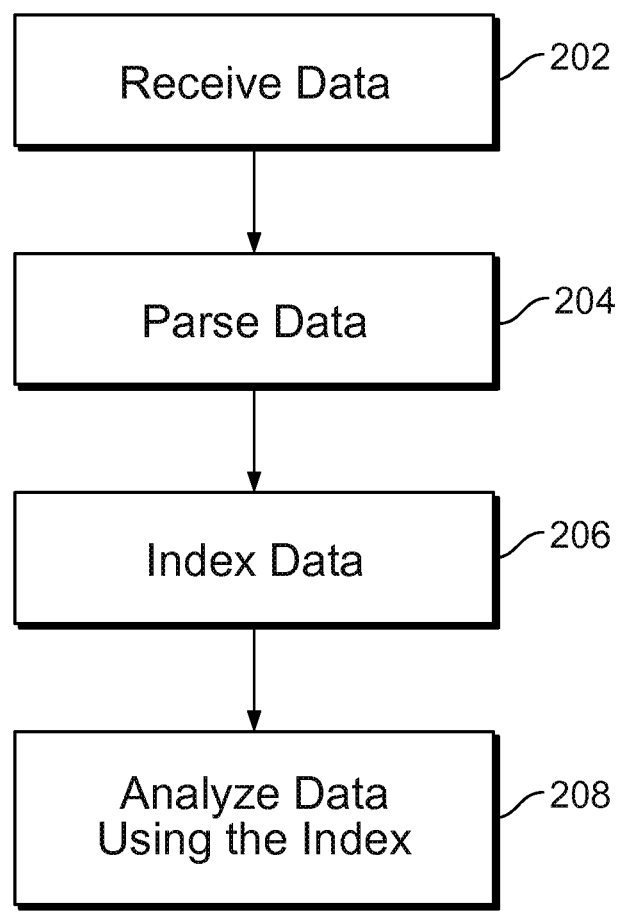
FIG. 2 is a flow chart illustrating an embodiment of a process for processing data.

FIG. 2 is a flow chart illustrating an embodiment of a process for processing data. This process may be at least in part implemented on data processor 104 and/or application 102 of FIG. 1. In various embodiments, portions of the process shown in FIG. 2 may be performed simultaneously or combined into a single step, as applicable. Portions of the process shown in FIG. 2 may also be omitted, as applicable. In the example shown, the process begins at 202. At 202, data to be indexed is received. In some embodiments, receiving the data includes receiving unstructured and/or semi-structured data from one or more data sources. Examples of the received semi-structured data includes, support artifacts, logs, configuration files, scripts, program code, system status, and any other form of data with tags, data types, metadata, or other markers to identify semantic elements, information, and/or hierarchies of records and/or fields of the data. In some embodiments, the data is received from a data source such as data source 110 and 112 of FIG. 1. The data may be received periodically, at a determined interval, dynamically, and/or when requested by the sender or the recipient. In some embodiments, receiving the data includes receiving a copy of the data to be indexed and storing/archiving the received data. The stored data may be compressed. In an alternative embodiment, receiving the data includes accessing the data to be indexed directly from a data source rather than receiving a copy of the data.

At 204, the data to be indexed is parsed. In some embodiments, parsing the data includes extracting structure information from the received data. Examples of the extracted structure information include tags, data types, metadata, or other markers to identify semantic elements, structures, information, and/or hierarchies of records and/or fields of the data. In some embodiments, parsing the data includes converting at least a portion of the received data to an intermediate format before the data is indexed. Converting the data into the indeterminate format may include identifying data types associated with text elements of a semi-structured data by extracting structural information associated with the semi-structured data. In various embodiments, additional processing is performed on the received data. For example, the received data is automatically and dynamically analyzed while the data is being parsed to detect patterns, trends, commonalties and/or differences.

At 206, an index is generated using information parsed at 204. In some embodiments, indexing includes organizing parsed data in a manner that facilitates pattern matching and/or searching of semi-structured and unstructured data. In some embodiments, indexing the received data includes enabling terms of the semi-structured or unstructured data to be searched efficiently and associating a data structure/type information and/or data location information with one or more of the terms. In some embodiments, an inverted index is created at 206.

At 208, data is analyzed using the index. For example, a structured query of the index is processed and matching result(s) of the query is returned. In some embodiments, a structured query includes a constraint on data-type and value of an element of the index. In some embodiments, at least a portion of the process of FIG. 2 is performed in a distributed processing environment. For example, each of one or more worker processes/systems process at least a portion of the processing required in 206 and/or 208, and the processing result of these worker processes/systems are managed/combined by a master process/system.

Figure 3:
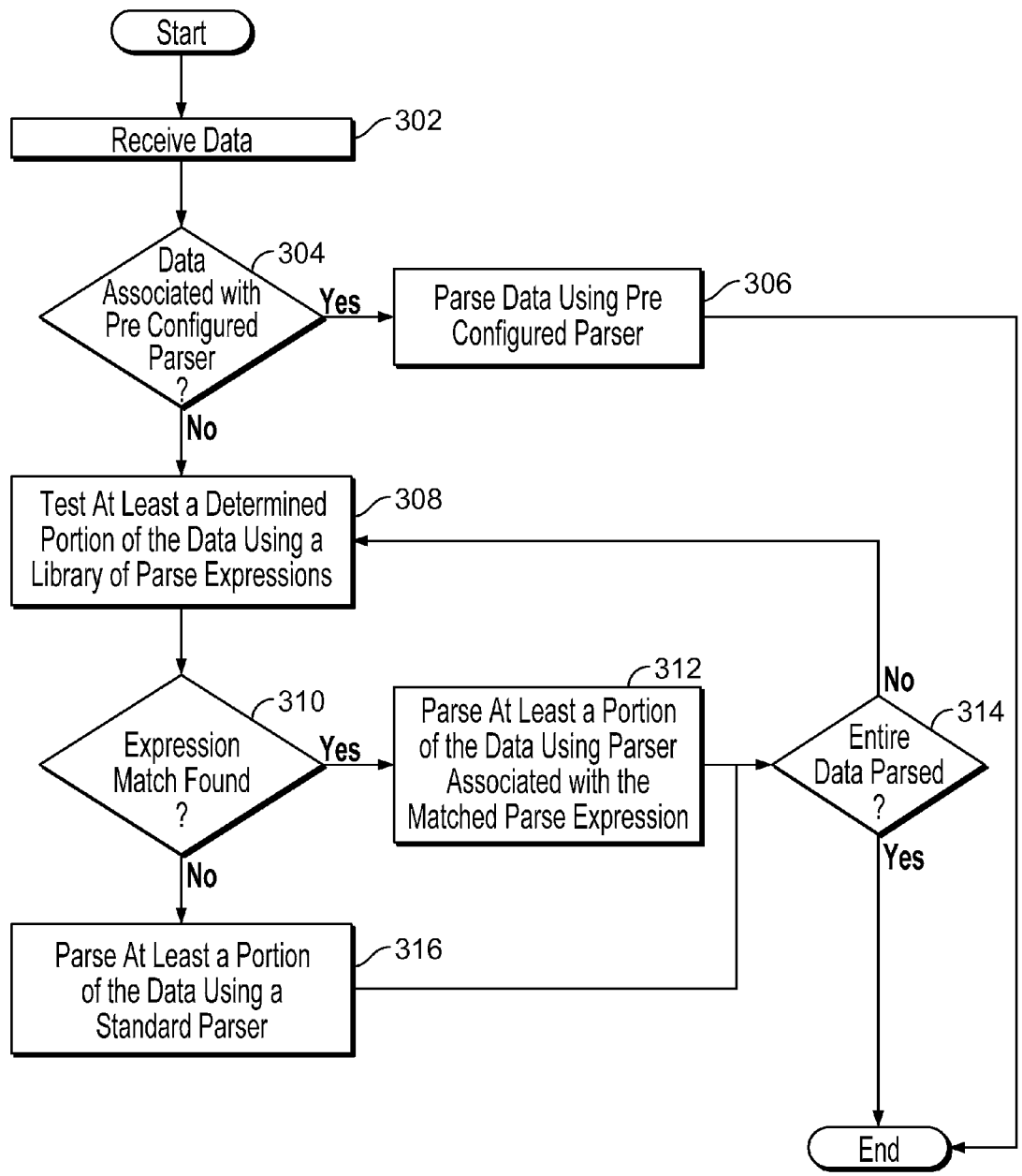
FIG. 3 is a flow chart illustrating an embodiment of a process for parsing data.

FIG. 3 is a flow chart illustrating an embodiment of a process for parsing data. This process may be at least in part implemented on data processor 104 of FIG. 1. In some embodiments, the process of FIG. 3 is included in 204 of FIG. 2. In various embodiments, portions of the process shown in FIG. 3 may be performed simultaneously or combined into a single step, as applicable. Portions of the process shown in FIG. 3 may also be omitted, as applicable. In the example shown, the process begins at 302. At 302, data to be parsed is received. In some embodiments, the data received at 302 is at least a portion of data received at 202 of FIG. 2. For example, a file to be parsed or a portion of a file to be parsed is received at 302. At 304, a determination is made on whether the received data is associated with a preconfigured parser. For example, a file name, a file type, a data source location, a preconfigured rule, a configuration file, a schema, header information, and/or a label associated with the received data may specify a specific parser(s) to be used to parse the received data. If it is determined that the data is associated with a preconfigured parser, at 306 the data is parsed and the process ends.

If at 304 it is determined that the data is not associated with a preconfigured parser, at 308 at least a determined portion of the data is tested using a library of parse expressions to determine how to parse the data. In some embodiments, the received data is scanned to detect segments such as repeating patterns or logical groupings within the received data. At least one of these groupings/segments is tested against each parse expression from a library of parse expressions to determine a parse expression that can be used to parse the grouping/segment. For example, a log file includes multiple log messages, and each log message is tested against a library of parse expressions. A parse expression may match with a log message because the parse expression specifies that a matching log entry includes a timestamp, a message type, and a free text message body. Different parse expressions may match the log message depending upon log attributes or message fields in the free text message body of the log message.

If at 310 a matching parse expression is found, at 312 at least a portion of the received data is parsed using at least a portion of a parser associated with the matched parse expression. In some embodiments, the parser associated with the matching parse expression is the matching parse expression that can be used to parse at least a portion of the received data. In some embodiments, the parser associated with the matching parse expression is used to parse more than the data portion determined at 308. For example, once one log message is matched with a parse expression, other associated log messages may be parsed using the parser associated with the matched parse expression. A plurality of parsers and/or parser portions may be associated with matched parse expression, and one or more of these parsers/portions may be used to parse at least a portion of the received data.

In some embodiments, parsing the data at 306 and/or at 312 includes extracting structure information from the received data. Examples of the structure information include tags, data types, metadata, or other markers to identify semantic elements, information, and/or hierarchies of records and/or fields of the data. In some embodiments, parsing the data includes converting at least a portion of the received data to an intermediate format before the data is indexed. Converting the data into the indeterminate format may include identifying data types associated with text elements of a semi-structured data by extracting structural information associated with the semi-structured data. In some embodiments, a parser uses a configuration file (e.g., eXtensible Markup Language based configuration file) to obtain information associated with parsing rules.

At 314, if it is determined that the entire received data has not been parsed, the process returns to 308 where at least a portion of the unparsed portion is tested against the library of parse expressions. At 314, if it is determined that the entire received data has been parsed, the process ends. At 310, if a parse expression match is not found, at 316, at least a portion of the received data is parsed using a standard parser. The standard parser may associate a generic tag, data type, marker, identifier, information, or hierarchy information with extracted information/text of the received data. The data parsed by the standard parser may be unstructured data and/or semi-structured that does not match any determined parse expression. In various embodiments, the standard parser is a generic parser that is able to parse any type of valid data to a desired form. After 316, the process returns to 314.

Figure 4A:
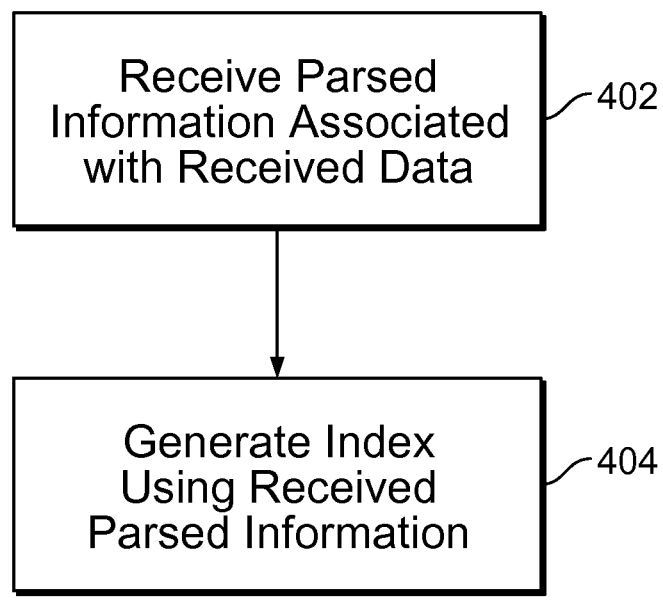
FIG. 4A is a flow chart illustrating an embodiment of a process for indexing data.

FIG. 4A is flow chart illustrating an embodiment of a process for indexing data. This process may be at least in part implemented on data processor 104 of FIG. 1. In some embodiments, the process of FIG. 4A is included in 206 of FIG. 2. In various embodiments, portions of the process shown in FIG. 4A may be performed simultaneously or combined into a single step, as applicable. Portions of the process shown in FIG. 4A may also be omitted, as applicable. In the example shown, the process begins at 402. At 402, parsed information associated with received data is received. For example, parsed information obtained using at least a portion of the process shown in FIG. 3 is received. In some embodiments, the parsed information is associated with data received from data source 110 and/or 112 of FIG. 1. In some embodiments, the index is sorted to facilitate efficient search.

At 404, an index is generated using the received parsed information. In some embodiments, generating the index includes organizing the parsed information in a manner that facilitates pattern matching/searching. In some embodiments, elements of data to be indexed are broken into terms that are the basic unit of definable search patterns. For example, a log message "monitor target=159.170.100.80" may be broken into three terms of "monitor", "target", and "159.170.100.80." In some embodiments, the index is an inverted index. For example, for each term in the previous example, an inverted list of log file identifiers that contain the term is created. In some embodiments, one or more instances of a term in the index is associated with structure information parsed from indexed data. For example, a data type and a position where the term appears in the log file are associated with each instance of the term. Other examples of structure information include tags, data types, metadata, semantic element identifiers, hierarchy information, and data attributes.

In some embodiments, the inverted index is associated with a sequence of documents. Each document is associated with a log file and assigned a unique document identifier. The document may contain one or more fields. Each field is further split into individual terms as appropriate. For example a term includes a text string. The inverted index stores mappings of terms to the documents that contain the term. In some embodiments, the inverted index includes for each term, a sorted list of document identifiers of documents that contain the term. In some embodiments, the inverted index includes for each term and each document, a sorted list of positions in the document that includes the term.

For example, three log files exist, and the files contain the following message.

Log File 1: System encountered fatal error.
Log File 2: Fatal system error: configuration error.
Log File 3: System configuration succeeded.

For the example above, the corresponding inverted index includes the following entries.

| Term (field = 'text') | List of Document Identifiers |
| --- | --- |
| Configuration | 1, 2 |
| Encountered | 0 |
| Error | 0, 1 |
| Fatal | 0, 1 |
| Succeeded | 2 |
| System | 0, 1, 2 |

| Term (field = 'text') | Positions in Documents: doc (positions) |
| --- | --- |
| Configuration | doc 1 (2), doc 2 (1) |
| Encountered | doc 0 (1) |
| Error | doc 0 (3), doc 1 (2, 4) |
| Fatal | doc 0 (2), doc 1 (0) |
| Succeeded | doc 2 (0) |
| System | doc 0 (0), doc 1 (1), doc 2 (0) |

In this index, Log File 1, 2, and 3 are indexed as doc 0, doc 1 and doc 2, respectively.

To efficiently preserve information of which terms belong to the same log message, positions of the first terms of every message in the same document are aligned on fixed boundaries. With the boundary size known a priori, deciding whether occurrences of terms belong to the same log message requires one in-memory arithmetic operation. For example, a log file indexed as doc 0 includes the following.

Message 0: File system checking passed.
Message 1: Memory system checking failed.

If the position boundaries are multiples of 2048, the term positions in the inverted index would include the following.

| Term (field = 'text') | Positions in Documents: doc (positions) |
|---|---|
| Checking | doc 0 (2, 2050) |
| Failed | doc 0 (2051) |
| File | doc 0 (0) |
| Memory | doc 0 (2048) |
| Passed | doc 0 (3) |
| System | doc 0 (1, 2049) |

In the example above, a search of the index can quickly determine that the message "file system checking passed" exists in the log file, because occurrences of all four terms fall within a message range. Additionally, it can be quickly determined that the message, "memory system checking passed," does not exist in the log file because although all four terms appear in the document, the position of the term "passed" (3) does not fall in the message range of the term "memory" (2048).

In embodiments, a same term is associated with a plurality of fields. The "text" field is the default field. For example, in the following log files, the term "error" appears in both the "severity" field and the "text" field.

Log File 1: [ERROR] file system fatal error.

Log File 2: [WARN] Failed to recover the fatal error.

The inverted index for the example above includes the following entries.

| Term (field = 'severity') | List of Document Identifiers |
|---|---|
| Error | 0 |
| Warn | 1 |

| Term (field = 'text') | List of Document Identifiers |
|---|---|
| Error | 0, 1 |
| ... | ... |

As shown above, different components of log messages can be stored in different index fields, and queries of individual fields as well as logic combinations of multiple fields can be performed.

Figure 4B:
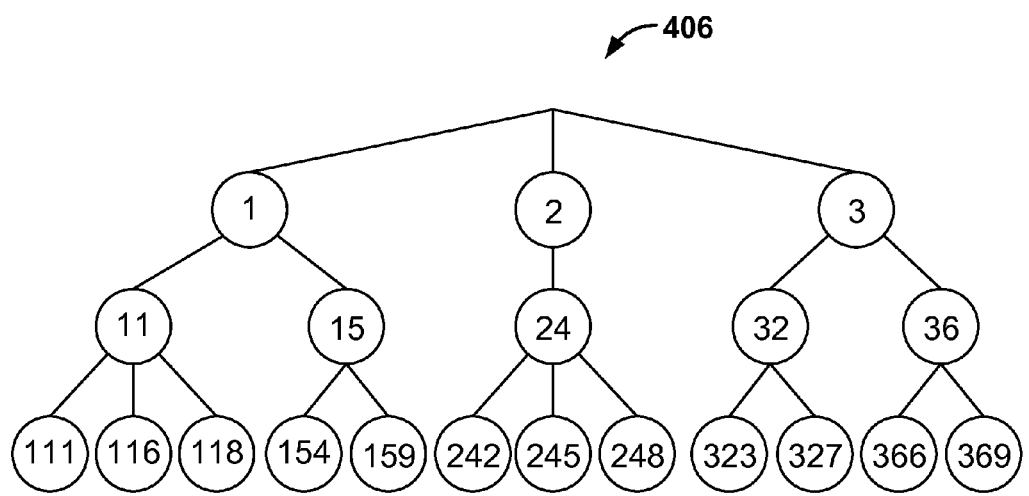
FIG. 4B is a chart showing a tree data structure.
Figure 4C:
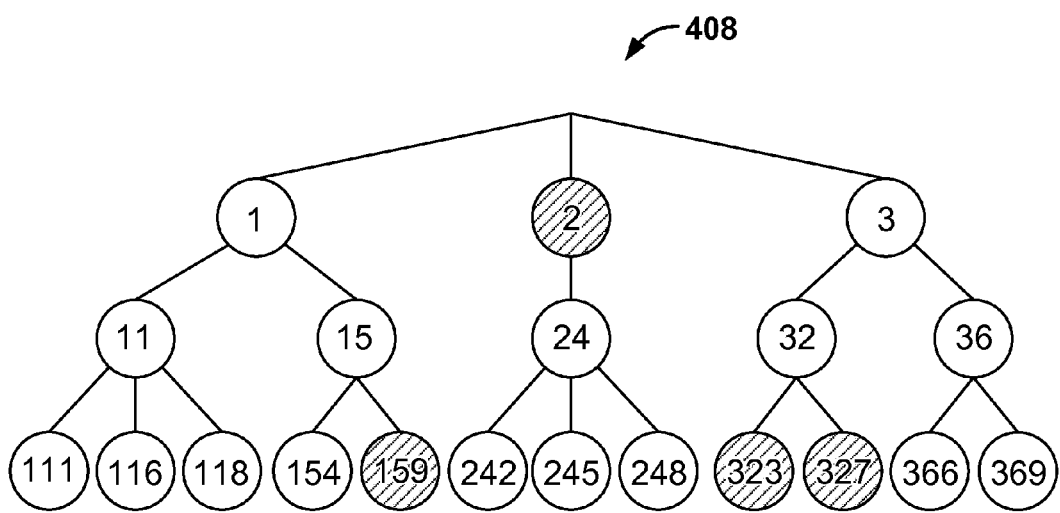
FIG. 4C is a chart showing a tree data structure with shaded terms to be used in a search.

In some cases, log messages contain fields that include numeric values (e.g., Timestamps of log messages). Indexing numeric values the same way as regular text fields may slow down range queries because all possible values that fall in the range would need to be searched. To speed up range queries of numeric fields, numeric field values are organized in a tree data structure. Each numeric value in the log message is indexed as multiple terms, and the terms become the root nodes of the tree. FIG. 4B is a chart shows tree data structure 406 for numerical terms 111, 116, 118, 154, 159, 242, 245, 248, 323, 327, 366, and 369. The root nodes include the numeric terms, and the intermediate nodes include successive beginning digit portions of the numeric terms. If a query seeks to find all numeric terms with values between 159 and 327, inclusive, only log messages with the four shaded terms as shown in tree data structure 408 of FIG. 4C need to searched rather than searching log messages with six terms (i.e., 159, 242, 245, 248, 323, and 327) if the numeric values were just indexed as text.

Figure 5A:
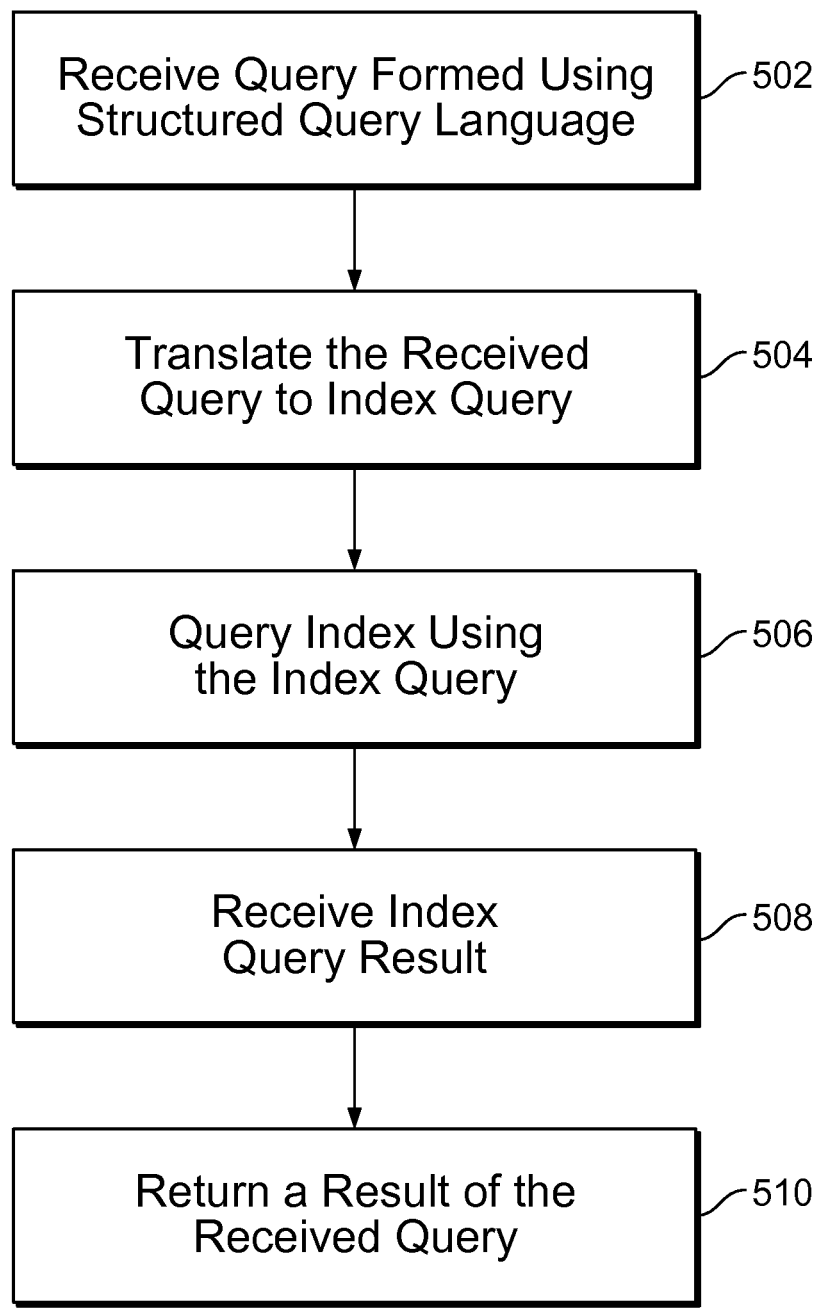
FIG. 5A is a flow chart illustrating an embodiment of a process for searching data using an index.

FIG. 5A is a flow chart illustrating an embodiment of a process for searching data using an index. In some embodiments, the index is associated with one or more indexes discussed in FIGS. 1, 2, 3, and/or 4A. This process may be at least in part implemented on data processor 104 and/or application 102 of FIG. 1. In some embodiments, the process of FIG. 5A is included in 208 of FIG. 2. In various embodiments, portions of the process shown in FIG. 5A may be performed simultaneously or combined into a single step, as applicable. Portions of the process shown in FIG. 5A may also be omitted, as applicable. In the example shown, the process begins at 502. At 502, a query is received. For example, a query formed using Pattern Insight Query Language described later in specification is received. In some embodiments, a query language used to form the received query can represent complex patterns that include event correlation, timing, and frequency across multiple artifacts. In some embodiments, the query is formed using a query builder that includes one or more of the following features: syntax highlighting, auto-completion, automatic error-checking, automatic syntax checking, and a reference guide.

At 504, the received query is translated into an index query. For example, the received structured search query is translated to a query form that can be processed by the index. In some embodiments, translating the received query includes checking the received query for errors. In some embodiments, translating the received query includes using a lexer to tokenize the received query and using a parser to map the received query to a grammar to be used to translate the received query to an index query form.

Figure 5B:
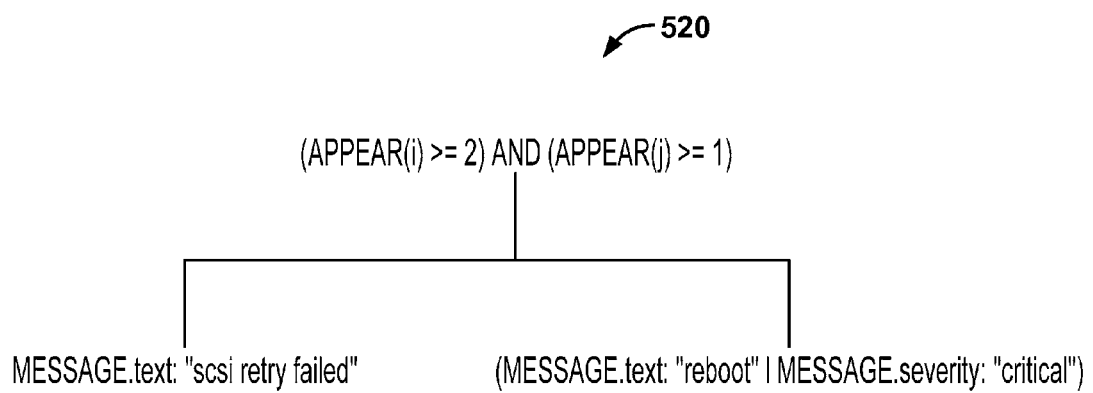
FIG. 5B is a chart showing a logic query tree of an example query.

In various embodiments, translating the query includes first parsing the received query including by identifying a query item that specifies a pattern to be matched/found. For example, the received query is parsed into a logic query tree with constraints. Each leaf of the tree represents an item constraint that may be composed of boolean sub-queries on one or multiple fields. A non-leaf node describes the relationship constraint among its children. To achieve better performance, the logic constraints of the received query is converted to a Disjunctive Normal Form of a logical formula and the constraints are reduced to the simplest form. For example, the received query is: SELECT*FROM*WHERE MESSAGE.text:"scsi retry failed" AS i & (MESSAGE.text: "reboot"|MESSAGE.severity:"critical") AS j HAVING COUNT(i)>=2 & COUNT(j)>=1. This query is parsed into logic query tree 520 as shown in FIG. 5B.

Figure 5C:
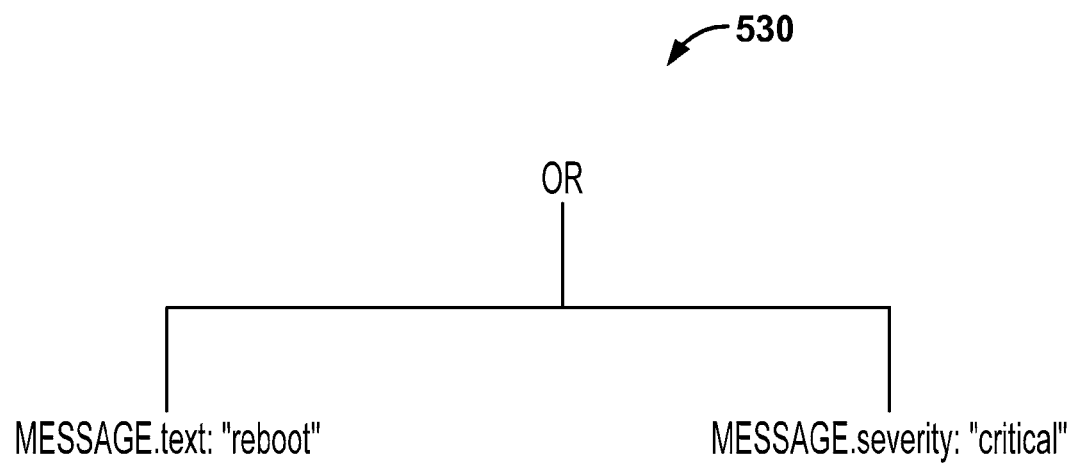
FIG. 5C is a chart showing a converted logic query tree.

Second, each leaf node is converted to a boolean tree. Each leaf node is one sub-query on a single field, which is a simple inverted index query on a term or a phrase on a field. For the example above, the right child leaf for item j is converted to boolean query tree 530 as shown in FIG. 5C.

Third, the inverted list is retrieved from the index for each term in each sub-query on a single field. For example, for a phrase sub-query MESSAGE.text:"scsi retry failed", three inverted lists are retrieved from index for terms "scsi", "retry" and "failed" on field MESSAGE.text.

At 506, the index is queried using the translated index query. In some embodiments, querying the index includes sending the translated index query to a system and/or processor (e.g., data processor 104 of FIG. 1) associated with the index. In some embodiments, querying the index includes directly querying an index such as index 106 of FIG. 1. Processing the index query may include walking through elements of a sorted inverted index. For each term, a sorted position list is traversed to find a block of positions in which all terms of interest appear in a desired order. The sorted position list enables this search to be performed in a single pass through the index.

For example, candidate messages are found by walking through the inverted lists for the terms in an item boolean query tree, and it can be determined whether the terms belong to the same log message and a phrase based on the term positions stored in the index. In the meantime, the boolean relationship described in the item boolean tree, if any, is applied to the terms in the same log message. If the constraints are satisfied, the log message will become a candidate. Then, candidate logs are found. By walking through the candidate message lists, it can be determined whether the messages belong to the same log based on the term positions. Applying the constraints described in the logic query tree on the candidate messages from the same log, all log candidates can be found if the constraints are satisfied.

At 508, an index query result is received. In some embodiments, this result includes one or more of the following: identifier(s) associated with a file(s) and/or location(s) of the data that matches the query, a copy of the data matches the query, structural information associated with the data matches query, other search results/patterns related to the data matches the query and any other information associated with the data that matches the query.

At 510, at least a portion of the received result is returned to a user. For example, the query results displayed in a user interface that allows the user to efficiently identify a pattern associated with the received result.

In the context of technical customer support, the process of FIG. 5A can be used to efficiently trouble shoot user problems. For example, a higher tier support engineer can codify his or her knowledge into a signature query after resolving an issue. Next time a beginning tier support engineer receives an issue, the support engineer can check a semi-structured support artifact (e.g., error log or a configuration file) against the signature query by querying an index that contains the support artifact using the signature query. If a match is found against one of the signature structured queries, a solution associated with the matching signature query can be offered as a solution to the customer. In some cases, this process can be automated by generating a report when a support artifact is received. This report includes results of one or more results of a signature query against an index that includes the received support artifact. The report will indicate any matches for known signature queries and associated causes and solutions.

In some cases, information technology vendors collect data from systems in use. Using the parsing, indexing, and searching processes described above, the vendor can analyze the collected data efficiently. For example, a product manager can find out if a new feature in the latest release of the product is functioning properly by querying an index generated using data collected from users.

Figure 6:
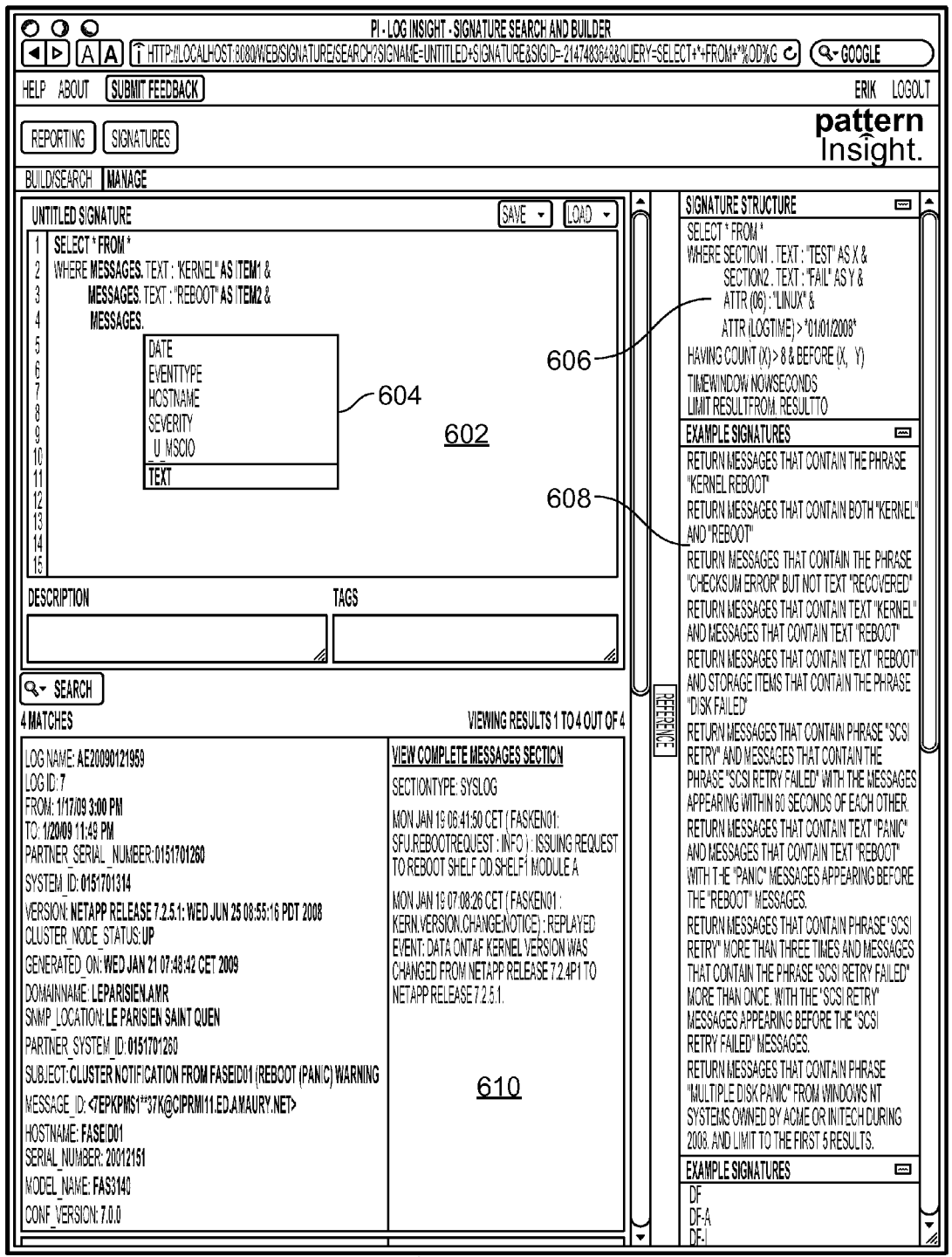
FIG. 6 is a user interface for building a query of an index and viewing a result of the query.

FIG. 6 is a user interface for building a query of an index and viewing a result of the query. In some embodiments, the index includes one of the indexes discussed above. In some embodiments, the user interface is included in application 102 of FIG. 1, used to analyze data in 208 of FIG. 2, used to receive a query at 502 of FIG. 5A, and/or used to return the result at 510 of FIG. 5A. User interface 600 includes area 602 where a user may input a query using a query language. Auto completion menu 604 offers a menu of valid syntax options in a given location of the query. Area 606 displays example options of signatures that can be used to analyze the indexed data. Area 608 displays an example signature syntax structure. For example, signature syntax structure is a signature of a higher tier support engineer that has codified his or her knowledge into the signature after resolving an issue. Area 610 displays results of a search query entered in area 602. One or more key terms of the query is highlighted in the displayed result.

In some embodiments, the query language described above is the Pattern Insight Query Language (PIQL). PIQL allows users to: query single-item pattern, using multiple conditions on item fields using Boolean logic, to query for multiple-item patterns; constrain the data source by specifying section names and log attributes; specify multiple types in conditions, including string, float and version; express patterns not only on whether an item occurs, but also on how many times it occurs; express multiple-item patterns on their temporal order; add a time-range constraint on patterns; and limit the scope of query results being returned.

Below is a chart summarizing PIQL Syntax clauses.

| Clause | Syntax Example | Description |
| --- | --- | --- |
| SELECT | SELECT* | Define the level of pattern matches retrieval. |
| FROM | FROM messages, sys-config | Define the source to retrieve pattern matches from. |
| WHERE | WHERE messages.text:"kernel"as i | Define the patterns. |
| HAVING | HAVING COUNT(i) > 5 | Filter pattern matches on occurrence times and occurrence orders. |
| TIME WINDOW | TIMEWINDOW 3600 | Specify the time-range constraint on patterns. |
| LIMIT | LIMIT 1, 9 | Limit the scope of query results. |

The SELECT, FROM and WHERE clauses of PIQL construct the basic form of query statement. The SELECT clause defines what will be returned from the query, the FROM clause defines from which sections query results are retrieved from, and the WHERE clause defines conditions on items and log attributes. The PIQL query in its basic form has the following syntax: SELECT what FROM sections WHERE pattern. In the SELECT clause, what can be "*", which means the query will return results at item level. In the FROM clause, sections can be in the form of section [AS alias] [, section [AS alias]]* or use "*" to refer to all sections. Only these section names (and aliases) specified in the FROM clause can be used in the WHERE clause to define log pattern. In the WHERE clause, pattern is defined in a form of a tree using Boolean operators such as & (AND), | (OR) and &! (AND NOT). The following statement, for example, returns matches satisfying condtion1 and one of condtion2 and condition3: SELECT*FROM*WHERE condition1 & (condition2| condition3).

There three types of leaf conditions: item_condition, log_attribute_condition and section_attribute_condition. The item_condition specifies conditions at item-level; while the log_attribute_condition and the section_attribute_condition specify conditions at log-level and section-level, respectively. The item_condition is defined in form of a tree using Boolean operators. The following statement, for example, returns matched log items that satisfy both item_condition1 and item_condition2: SELECT*FROM*WHERE (item_condition1 & item_condition2) AS item_alias.

The leaf item_condition has syntax section.field compare_op value, where section must be included in the FROM clause and compare_op must be comparable with types of field and value. The following statement, for example, returns log items which are from section MESSAGES and have "reboot" and "kernel" in their field text: SELECT*FROM*WHERE (MESSAGES.text:"reboot" & MESSAGES.text:"kernel") AS item1.

The log_attribute_condition has syntax ATTR(log_attribute) compare_op value, where compare_op must be comparable with types of log_attribute and value. The following statement, for example, returns log items which are from section MESSAGES and have "reboot" and "kernel" in their field text: SELECT*FROM*WHERE (MESSAGES.text:"reboot" & MESSAGES.text:"kernel") AS item1 & ATTR (version)<VERSION("2.6"). Furthermore, all matched log items must be from logs whose attribute version is lower than 2.6.

The section_attribute_condition has syntax ATTR(section, section_attribute) compare_op value, where section must be included in the FROM clause and compare_op must be comparable with types of section_attribute and value. The following statement, for example, returns log items which are from section MESSAGES and have "reboot" and "kernel" in their field text: SELECT*FROM*WHERE (MESSAGES.text:"reboot" & MESSAGES.text:"kernel") AS item1 & ATTR(MESSAGES, system): "linux". Furthermore, all matched log items must be from MESSAGES sections whose attribute system contains the string "linux."

The HAVING clause is an optional part of a PIQL query, specifying filter on query matches. COUNT clause specifies filtering condition on item occurrence time while BEFORE clause specifies filtering condition on items. temporal order. The PIQL query with HAVING clause has the following syntax: SELECT what FROM sections WHERE pattern HAVING filter. The filter is defined in a form of a tree using Boolean operators such as & (AND), | (OR) and &! (AND NOT). The following statement, for example, returns matches filtered on filter1 and filter2: SELECT*FROM*WHERE pattern HAVING filler1 & filter2.

There are two types of leaf filters: COUNT filter and BEFORE filter. The COUNT filter has syntax COUNT (item_alias) compare_op value, where item_alias must be defined in one of Item clauses at the WHERE clause; compare_op must be one of <, <=, >, and >=; and value must be with type of integer. The following statement, for example, returns log items which are from section MESSAGES and have "reboot" and "kernel" in their field text: SELECT*FROM*WHERE (MESSAGES.text:"reboot" & MESSAGES.text:"kernel") AS item1 HAVING COUNT (item1)>3. Furthermore, the log item must appear for more than 3 times within the same log file.

The BEFORE filter has syntax BEFORE(item_alias1, item_alias2). The following statement, for example, returns two-item log patterns which are from section MESSAGES and have "panic" and "reboot" in their field text, respectively: SELECT*FROM*WHERE MESSAGES.text: "panic" AS item1 & MESSAGES.text:"reboot" AS item2 HAVING BEFORE(item1, item2). Furthermore, the log item has "panic" must be temporally ahead of the log item has "reboot."

Optionally, BEFORE filter can specify minimal distance between two items, using syntax BEFORE(item_alias1, item_alias2,minDistance). The following statement, for example, requires minimal distance between any appearances of the two items to be at least 5 minutes (inclusive) in addition to requirements mentioned above: SELECT*FROM*WHERE MESSAGES.text:"panic" AS item1 & MESSAGES.text:"reboot" AS item2 HAVING BEFORE(item1, item2, 300).

The TIMEWINDOW clause is an optional part of a PIQL query, specifying time range (exclusive) of log patterns. Without the TIMEWINDOW clause, the default time range is the whole log file. The PIQL query with TIMEWINDOW clause has the following syntax: SELECT what FROM sections WHERE pattern TIMEWINDOW seconds.

The LIMIT clause is an optional part of a PIQL query, specifying the range of log pattern matches to be returned. Without the LIMIT clause, the first 10 log pattern matches are returned. The PIQL query with LIMIT clause has the following syntax: SELECT what FROM sections WHERE pattern LIMIT start, length.

The following table summarizes supported types and corresponding operations in the WHERE clause.

| Type | Operators | Syntax Example |
| --- | --- | --- |
| String | : | MESSAGES.text:"reboot" |
| Long | >, <, >=, <=, = | MESSAGES.retryCount >= 5 |
| Version | >, <, >=, <=, = | ATTR(kernelVer) <= VERSION("2.6") |
| Timestamp | >, <, >=, <=, = | ATTR(logTime) <= '8/31/2009 12:00:00' |

In the HAVING clause, COUNT filter only supports two operations: > and >=.

Below are examples of PIQL queries.

Log items from message section that contain text "kernel reboot": SELECT*FROM*WHERE message.text:"kernel reboot" AS item1

Log items from message section that contain both "kernel" and "reboot": SELECT*FROM*WHERE (message.text:"kernel" & message.text:"reboot") AS item1

Logs items from message section that contain text "checksum error" but text "recovered": SELECT*FROM*WHERE (message.text:"checksum error" &! message.text:"reboot") AS item1

Two log items from message section. One contains text "scsi retry"; the other contains text "scsi retry failed": SELECT*FROM*WHERE message.text:"scsi retry" AS item1 & message.text:"scsi retry failed" AS item2

Find one log item from message section containing text "reboot" the other log item from storage section containing text "disk failed": SELECT*FROM message AS m, storage AS s WHERE m.text:"reboot" AS item1 & s.text:"disk failed" AS item2

Log item from message section containing text "reboot" while in the same log file, there is no log item from storage section containing text "disk failed": SELECT*FROM message AS m, storage AS s WHERE m.text:"reboot" AS item1 &! s.text:"disk failed" AS item2

From message section, one log item containing text "scsi retry" appears more than 3 times and the other log item containing text "scsi retry failed" appears more than once after the former item: SELECT*FROM message AS m WHERE m.text:"scsi retry" AS item1 & m.text: "scsi retry failed" AS item2 HAVING COUNT (item1)>3 & COUNT(item2)>1 & BEFORE(item1, item2)

From message section, find log items containing "multiple disk panic" from window NT systems owned by Company A or Company B during 2008: SELECT*FROM*WHERE message.text:"multiple disk panic" AS item1 & ATTR(OS): "windows NT" &

(ATTR(owner): "Company A" | ATTR(owner): "Company B") & ATTR(logTime)>='Jan. 1, 2008' & ATTR(logTime)<='Dec. 31, 2008'

From message section, there exists a time window of at least one hour in which text "scsi retry" appears in more than 3 messages and text "scsi retry failed" appears in more than one message. In addition, the at least one messages containing "scsi retry" must appear before messages containing "scsi retry failed": SELECT*FROM message as m WHERE m.text:"scsi retry" AS item1 & m.text:"scsi retry failed" AS item2 HAVING COUNT(item1)>3 & COUNT(item2)>1 & BEFORE(item1, item2) TIMEWINDOW 3600

From message section, there exists a time window of at least one hour in which text "scsi retry" appears in more than 3 messages and text "scsi retry failed" appears in more than one message. Furthermore, the messages containing "scsi retry" must be appear at least 30 minutes before messages containing "scsi retry failed": SELECT*FROM message as m WHERE m.text:"scsi retry" AS item1 & m.text:"scsi retry failed" AS item2 HAVING COUNT(item1)>3 & COUNT(item2)>1 & BEFORE(item1, item2, 1800) TIMEWINDOW 3600

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method for generating an inverted index comprising:
receiving a file comprising data, wherein at least a portion of the data is unstructured or semi-structured data;
parsing the data to extract structure from at least a portion of the data, wherein the parsing comprises (i) dividing the data into logical groupings, (ii) determining whether each of the logical groupings matches any of a plurality of stored parsing expressions, (iii) applying each of the matching parsing expressions to a corresponding one of the logical groupings to produce elements of data; (iv) applying a general parser to any of the logical groupings that do not match any of the stored parsing expressions to produce elements of data, and (v) identifying a data type associated with each of the elements of data produced in (iii) and (iv);
generating the inverted index using the extracted structure, wherein each item in the inverted index includes one of the elements of data produced in (iii) and (iv), a location identifier, a position identifier, and a data type identifier for one or more entries of the inverted index,
wherein the location identifier specifies an identifier of the file that contains the element of data, the position identifier specifies a position of the element of data within the file, and the data type identifier specifies the data type of the element of data, and the inverted index is utilized to respond to queries to identify patterns within the data.

2. The method as recited in claim 1, wherein the data includes at least a portion of one or more of the following: a support artifact, a log, a configuration file, a script, a program code, and a system status.

3. The method as recited in claim 1, wherein the extracted structure is associated with one or more of the following: a tag, a data type, a metadata, a marker, and a hierarchy of a field of the semi-structured data.

4. The method as recited in claim 1, further comprising receiving additional data from a plurality of data sources, parsing the additional data, and associating the data sources with corresponding entries of the inverted index.

5. The method as recited in claim 4, wherein parsing the additional data from the plurality of data sources is performed in a distributed processing environment, each of a plurality of worker processes parses at least a portion of the additional data, and a master process manages processing results of the worker processes.

6. The method as recited in claim 1, wherein parsing the data further includes determining whether at least a portion of the data is associated with a preconfigured parser.

7. The method as recited in claim 6, wherein the step of determining whether at least a portion of the data is associated with a preconfigured parser comprises identifying at least one of a name of the file, a type of the file, a location of the file, a rule associated with the file, header information in the file, a configuration file associated with the file, a scheme associated with the file, or a label associated with the file that specified the preconfigured parser.

8. The method as recited in claim 1,
wherein the data of the file is organized into groups of content, wherein first elements of the groupings are aligned on fixed boundaries and within the file, the fixed boundaries having a pre-determined fixed boundary size; and
wherein the position identifier is associated with the fixed boundary size used to determine a grouping of content within the data.

9. The method as recited in claim 8, further comprising:
determining a message comprised of a plurality of terms exists within the received file based on position identifiers for the plurality of terms being within a range of the fixed boundary size.

10. The method as recited in claim 1, wherein the inverted index associates for at least one entry, an instance identifier for each of a plurality of locations where the element of data corresponding to the entry appears in the file.

11. The method as recited in claim 10, further comprising sorting the instance identifiers associated with the element.

12. The method as recited in claim 1, further comprising receiving a search query, and processing the received search query.

13. The method as recited in claim 12, wherein the processing the received search query includes translating the received search query to a different query form used to search the inverted index.

14. The method as recited in claim 1, further comprising automatically generating a report at least in part by querying the inverted index.

15. The method as recited in claim 1, wherein at least one of the logical groupings is parsed by multiple parsers.

16. A system for generating an inverted index, comprising:
a processor configured to:
receive a file comprising data, wherein at least a portion of the data is unstructured or semi-structured data;
parse the data to extract structure from at least a portion of the data, wherein the parsing comprises (i) dividing the data into logical groupings, (ii) determining whether each of the logical groupings matches any of a plurality of stored parsing expressions, (iii) applying each of the matching parsing expressions to a corresponding one of the logical groupings to produce elements of data; (iv) applying a general parser to any of the logical groupings that do not match any of the stored parsing expressions to produce elements of data, and (v) identifying a data type associated with each of the elements of data produced in (iii) and (iv); and generate the inverted index using the extracted structure, wherein each item in the inverted index includes one of the elements of data produced in (iii) and (iv), a location identifier, a position identifier, and a data type identifier for one or more entries of the inverted index, wherein the location identifier specifies an identifier of the file that contains the element of data, the position identifier specifies a position of the element of data within the file, and the data type identifier specifies the data type of the element of data, and the inverted index is utilized to respond to queries to identify patterns within the data; and a memory coupled to the processor and configured to provide the processor with instructions.

17. The system recited in claim 16, wherein the processor is further configured to receive a search query and process the received search query.

18. The system recited in claim 17, wherein the processor is configured to process the received search query by translating the received search query to a different query form used to search the inverted index.

19. A computer program product for generating an inverted index, the computer program product being embodied in a non-transitory computer readable storage medium and comprising computer instructions which, when executed on a processor, perform the steps of:

receiving a file comprising data, wherein at least a portion of the data is unstructured or semi-structured data;

parsing the data to extract structure from at least a portion of the data, wherein the parsing comprises (i) dividing the data into logical groupings, (ii) determining whether each of the logical groupings matches any of a plurality of stored parsing expressions, (iii) applying each of the matching parsing expressions to a corresponding one of the logical groupings to produce elements of data; (iv) applying a general parser to any of the logical groupings that do not match any of the stored parsing expressions to produce elements of data, and (v) identifying a data type associated with each of the elements of data produced in (iii) and (iv);

generating the inverted index using the extracted structure, wherein each item in the inverted index includes one of the elements of data produced in (iii) and (iv), a location identifier, a position identifier, and a data type identifier for one or more entries of the inverted index, wherein the location identifier specifies an identifier of the file that contains the element of data, the position identifier specifies a position of the element of data within the file, and the data type identifier specifies the data type of the element of data, and the inverted index is utilized to respond to queries to identify patterns within the data.

20. The computer program product recited in claim 19, further comprising computer instructions for: receiving a search query and processing the received search query.

* * * * *